US012694350B2

(12) United States Patent
Organ et al.

(10) Patent No.: US 12,694,350 B2
(45) Date of Patent: Jul. 28, 2026

(54) MINE SITE ELECTRIFICATION PLANNING BY COMPUTER SIMULATION

(71) Applicant: Caterpillar Inc., Peoria, IL (US)

(72) Inventors: Daniel Jude Organ, Peoria, IL (US); Stefan Jacob Wulf, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 100 days.

(21) Appl. No.: 18/080,782

(22) Filed: Dec. 14, 2022

(65) Prior Publication Data

US 2024/0202627 A1 Jun. 20, 2024

(51) Int. Cl.
| | |
|---|---|
| *G06Q 10/0631* | (2023.01) |
| *G06Q 10/30* | (2023.01) |
| *G06Q 50/02* | (2024.01) |
| *G06Q 50/06* | (2024.01) |

(52) U.S. Cl.
CPC ....... *G06Q 10/06315* (2013.01); *G06Q 10/30* (2013.01); *G06Q 50/02* (2013.01); *G06Q 50/06* (2013.01)

(58) Field of Classification Search
CPC .. G06Q 10/06315; G06Q 10/30; G06Q 50/02; G06Q 50/06
See application file for complete search history.

(56) References Cited

U.S. PATENT DOCUMENTS

| | | | |
|---|---|---|---|
| 8,000,946 B2 | 8/2011 | Haas et al. | |
| 8,090,560 B2 | 1/2012 | Greiner et al. | |
| 8,504,505 B2 | 8/2013 | Mintah | |
| 9,616,899 B2 | 4/2017 | Sprock et al. | |
| 9,822,509 B1 | 11/2017 | Chi et al. | |
| 11,400,829 B1* | 8/2022 | Hajimiri | ................. B60L 53/68 |
| 2006/0273756 A1* | 12/2006 | Bowling | ................. B60L 53/68 320/107 |
| 2015/0109287 A1 | 4/2015 | Grichnik et al. | |
| 2016/0163222 A1 | 6/2016 | Sprock et al. | |
| 2016/0314421 A1 | 10/2016 | Watkins | |

(Continued)

FOREIGN PATENT DOCUMENTS

| | | | | |
|---|---|---|---|---|
| AU | 2021200116 A1 * | 8/2021 | .......... | B60W 60/007 |
| CN | 110599058 A | 12/2019 | | |

(Continued)

OTHER PUBLICATIONS

Maadani, Mohsen; Industrial Internet of Things in Mine Electrification; Mar. 2024; IEEE Magazine; pp. 46-55 (Year: 2024).*

(Continued)

*Primary Examiner* — Dylan C White

(57) ABSTRACT

A mine site electrification planning apparatus includes a model component to simulate mine site operations under a mine site electrification plan. A simulation control component may provide configuration data to the model component that are descriptive of varying distributions of zero greenhouse gas emitting (ZGHG) mining assets for which the mine site electrification plan is simulated. An optimization control component may identify the configuration data associated with the simulated mine site electrification plan that meets an economic optimization criterion related to physically implementing the mine site electrification plan.

19 Claims, 6 Drawing Sheets

(56)               References Cited

U.S. PATENT DOCUMENTS

| | | | | |
|---|---|---|---|---|
| 2018/0060776 | A1* | 3/2018 | Ahmed | G07C 5/0808 |
| 2019/0062820 | A1* | 2/2019 | Klapperich | B01L 3/5023 |
| 2019/0267832 | A1* | 8/2019 | Oikarinen | H02P 5/00 |
| 2020/0132882 | A1 | 4/2020 | Runkana et al. | |
| 2021/0232137 | A1* | 7/2021 | Whitfield, Jr. | G05D 1/0276 |
| 2024/0067038 | A1* | 2/2024 | Dowling | G01C 21/3469 |
| 2024/0420518 | A1* | 12/2024 | Everly | G07C 5/008 |

FOREIGN PATENT DOCUMENTS

| | | | | | |
|---|---|---|---|---|---|
| CN | 111489047 | A | 8/2020 | | |
| CN | 111601277 | | 8/2020 | | |
| CN | 115170005 | | 10/2022 | | |
| WO | WO-2016118122 | A1* | 7/2016 | | G06Q 50/02 |
| WO | WO-2023023790 | A1* | 3/2023 | | B60W 60/0025 |
| WO | WO-2025144520 | A1* | 7/2025 | | G06Q 30/018 |
| WO | WO-2025208185 | A1* | 10/2025 | | B60L 58/12 |

OTHER PUBLICATIONS

Ciller, Pedro; Optimal Electrification Planning Incorporating On- and Off-grid Technologies the Reference Electrification Model (REM); Sep. 9, 2019; IEEE; vol. 107; pp. 1872-1905 (Year: 2019).*
Assimi, Hirad; Toward Underground Mobile Fleet Electrification; Mar. 2024; IEEE Electrification Magazine; pp. 16-26. (Year: 2024).*
Written Opinion and International Search Report for Int'l. Patent Appln. No. PCT/US2023/079560, mailed Mar. 18, 2024 (9 pgs).

* cited by examiner

MINE SITE ELECTRIFICATION PLANNING BY COMPUTER SIMULATION

TECHNICAL FIELD

The present disclosure relates to mine site planning by computer simulation. More specifically, the present disclosure relates to simulating mine site operations under site electrification procedures to determine an economically optimal mine site electrification plan.

BACKGROUND

Global demand for mined products, e.g., metal ores and other geological materials, seems all but unquenchable. Nevertheless, modern mine operators engage a fleet of often massive mining machines to meet that demand. Mining machines and supporting equipment, such as refueling equipment, not to mention the mine site itself represent a significant economic outlay by mine operators. Accordingly, prudent mine site planning including long-term planning over the lifetime of the mine is essential where economics are a concern.

While mine operators seek to minimize the business impact of mine site infrastructure costs, they also seek to minimize the environmental impact of mining operations. Recent developments in net-zero greenhouse gas (GHG; ZGHG for zero GHG) technologies include local electric power sources, such as rechargeable batteries and hydrogen fuel cells, that provide sufficient electrical current for mining operations by electric motors, thus affording a technique by which GHGs from exhaust, for example, can be reduced. However, electrification of a mine site, i.e., adapting the mine site machinery and supporting equipment for mine site operations that rely on local electric power sources, is yet another significant cost against the mine operator's bottom line.

US Patent Application Publication 2016/0314421 is directed to market-driven mining optimization and is an example of a mining management system that seeks optimal mine site operations. In this case, the proposed system models mine site operations in view of provided market data to determine a most cost-effective delivery of mined products to a customer's dump site.

US Patent Application Publication 2020/0132882 is directed to online monitoring and optimization of mining and mineral processing operations. Key performance indicators of interest from at least one of mining operations, a comminution circuit, and a flotation and concentration circuit are selected and provided to the system. The proposed method and system seek to improve key performance indicators such as cost of mining operations or specific energy consumption in a comminution circuit to maximize yield of a desired particle size or grade and recovery of a mineral of interest while considering operational constraints.

US Patent Application Publication 2016/0163222 is directed to a work site simulation and optimization tool that allows for optimization of various worksite processes by considering unique site characteristics such as the number of haul routes available and machine design performance information of machines operating on the worksite. Proposed site goals targeted by the system include optimized cost of production, productivity, etc.

While different mechanisms exist for optimizing mining operations for different goals, mine site electrification planning, particularly over a long term, entails considerations not captured in the prevailing art. For example, unlike fossil fuel tanks that typically last for the lifetime of the machine, rechargeable batteries, hydrogen fuel cells and the like have a shorter usable lifetime and may require replacement prior to cessation of mining operations. Moreover, such rechargeable power sources suffer diminished recharge capacity, e.g., holding charge, producing current, etc., by cyclic discharge/recharge of the power sources over time.

SUMMARY

In one aspect of the present inventive concept, a mine site electrification planning apparatus includes a model component to simulate mine site operations under a mine site electrification plan. A simulation control component may provide configuration data to the model component that are descriptive of varying distributions of zero greenhouse gas emitting (ZGHG) mining assets for which the mine site electrification plan is simulated. An optimization control component may identify the configuration data associated with the simulated mine site electrification plan that meets an economic optimization criterion related to physically implementing the mine site electrification plan. The apparatus may also operate in an exploratory mode that bypasses the optimization control component in favor of manual (computer-assisted) investigation of simulated mine site electrification plans. Optionally, processor circuitry may be implemented and constructed to accept configuration data that define distributions of electrical mining machines and supporting equipment that cooperate in a corresponding mine site electrification plan.

In another aspect of the present inventive concept, a processor-executable mine site electrification planning process accepts a configuration data structure defining a distribution of ZGHG mining assets. Mining operations may be simulated using the distribution of ZGHG mining assets defined in the configuration data structure and the simulated mining operations are analyzed for economic factors in implementing a mine site electrification plan in accordance therewith. The distribution of ZGHG assets in the configuration data structure may be iteratively modified and the mining operations simulated therewith are analyzed seeking the distribution of ZGHG mining assets for which the economic factors meet an optimization condition. The mine site electrification plan that uses the distribution of ZGHG mining assets for which the analyzing thereof indicates the economic factors meet the optimization condition may be provided. Processor circuitry may be constructed to accept configuration data that define distributions of electrical mining machines and supporting equipment that cooperate in a corresponding mine site electrification plan.

In yet another aspect of the present inventive concept, a mine site electrification planning system includes memory circuitry to store model data, simulation instruction code and site planning instruction code. Processor circuitry may be constructed to accept configuration data that define distributions of electrical mining machines and supporting equipment that cooperate in a corresponding mine site electrification plan. The simulation instruction code may be executed to retrieve the model data and to simulate therewith temporal evolution of the mine site electrification plan under conditions established by the configuration data. The site planning instruction code may be executed to iteratively provide to the executing simulation instruction code modified configuration data until an optimal mine site electrification plan meets an optimization criterion. The optimization criterion may be indicative of a cost factor of mine operations that physically implement the corresponding mine site electrification plan. A user interface may display the configuration data with which the optimal mine site electrification plan was simulated.

DETAILED DESCRIPTION

Figure 1:
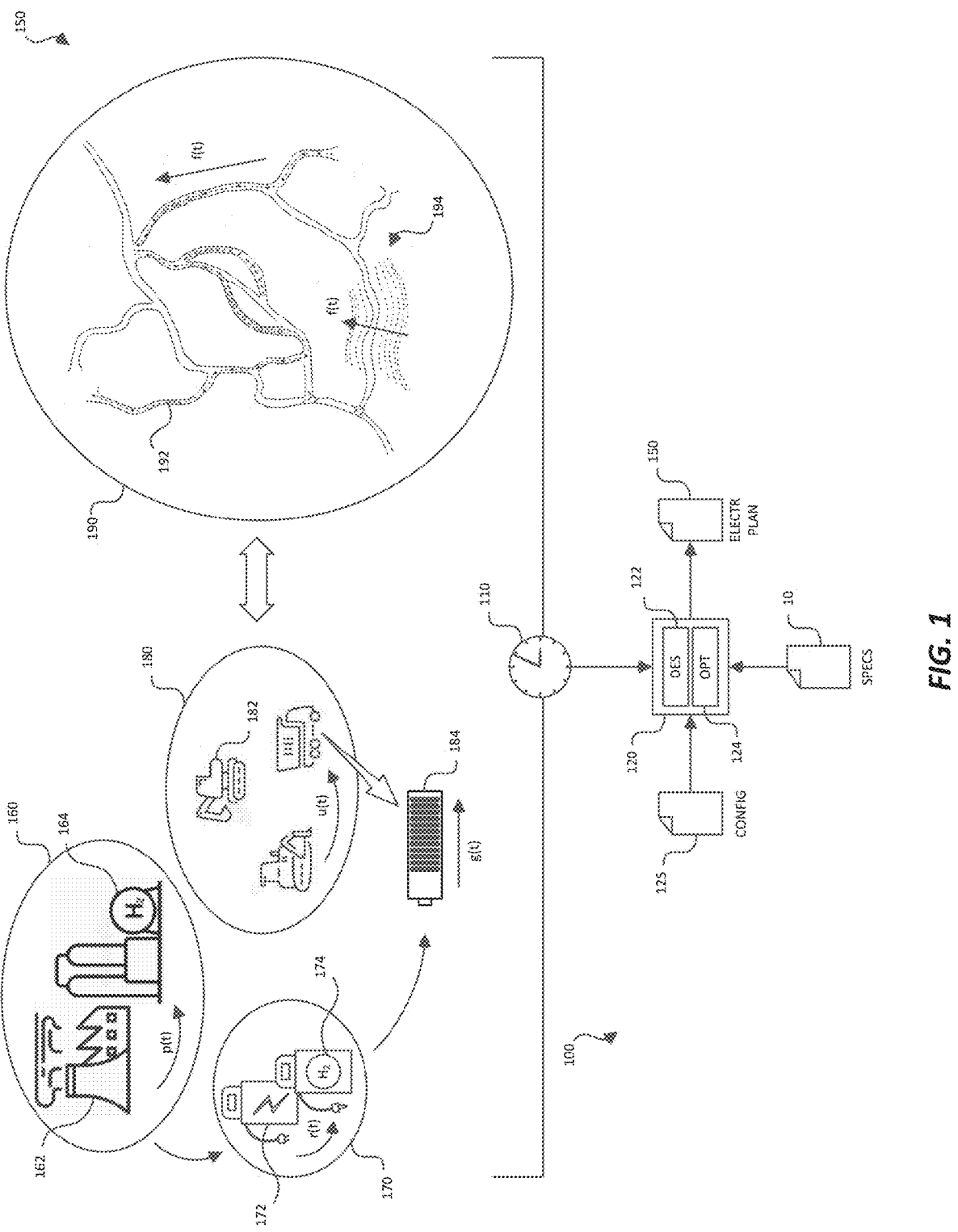
FIG. 1 is a schematic illustration of an exemplary mine site electrification planning system by which the present inventive concept can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments.

Additionally, mathematical expressions are contained herein and those principles conveyed thereby are to be taken as being thoroughly described therewith. It is to be understood that where mathematics are used, such is for succinct description of the underlying principles being explained and, unless otherwise expressed, no other purpose is implied or should be inferred. It will be clear from this disclosure overall how the mathematics herein pertain to the present invention and, where embodiment of the principles underlying the mathematical expressions is intended, the ordinarily skilled artisan will recognize numerous techniques to carry out physical manifestations of the principles being mathematically expressed.

The figures described herein include schematic block diagrams illustrating various interoperating functional modules. Such diagrams are not intended to serve as electrical schematics and interconnections illustrated are intended to depict signal flow, various interoperations between functional components and/or processes and are not necessarily direct electrical connections between such components. Moreover, the functionality illustrated and described via separate components need not be distributed as shown, and the discrete blocks in the diagrams are not necessarily intended to depict discrete electrical components.

The techniques described herein are directed to mine site electrification planning. As used herein, the term "electrification" is intended to mean adapting mine site machinery and supporting equipment for mine site operations that rely on machine-local electric power sources. This includes smaller transitional deployments whereby GHG producing technology is gradually replaced with ZGHG technologies, e.g., over several deployment phases. Upon review of this disclosure and appreciation of the concepts disclosed herein, the ordinarily skilled artisan will recognize other ZGHG deployment planning contexts in which the present inventive concept can be applied. The scope of the present invention is intended to encompass all such alternative implementations.

FIG. 1 is a schematic illustration of an exemplary mine site electrification planning (MSEP, also used for mine site electrification plan) system 100 by which the present invention can be embodied. MSEP system 100 may be constructed or otherwise configured to simulate an MSEP, such as that graphically depicted at MSEP 150. As used herein, an MSEP is a specification of the manner and mechanisms for implementing a zero greenhouse gas (GHG; ZGHG refers to zero, or more accurately, net-zero GHG) policy at a mine site. As used herein, ZGHG is meant to refer to net-zero greenhouse gas emissions and a ZGHG policy, strategy and similarly derived terms is meant to refer to one constraining the use of machinery that produce GHG emissions, e.g., machinery relying on internal combustion engines burning fossil fuel, in favor of machinery that produces near-zero or zero GHG emissions, while still meeting satisfactory production levels. Such machinery includes that relying on rechargeable batteries or hydrogen ($H_2$) fuel cells. For purposes of conciseness, machinery that produce GHG emissions may be referred to herein as GHG machinery, GHG machines and similarly derived terms, and machinery that produces near-zero or zero GHG emissions may be referred to herein as ZGHG machinery, ZGHG machines and similarly derived terms. Embodiments of the present invention, such as exemplary MSEP system 100, implement techniques by which a transition may be planned whereby GHG emission technology is replaced with ZGHG technology. Such transition may be a long-term project that occurs in concert with ongoing mining operations, preferably with minimal impact on day-to-day production goals. While the exemplary embodiments described herein, including MSEP system 100, assume it is such a transition that is to be planned, the invention may also be embodied for planning future mine sites, including those deploying site-wide ZGHG technology from the outset.

To introduce basic principles MSEP system 100 and other embodiments herein, simulated MSEP 150 is a graphical representation of a general MSEP, which may be implemented as a time-indexed data structure or file and may be read/write accessible to a data processor, such as processing system 120. Central to MSEP 150 is site map 190, which may be implemented as a data structure defining time-dependent locations of, among other things, site routes 192 and mine face 194. It is to be understood that a site map, as the term is used herein, may be a complete specification of the mine site, including the terrain, site-wide traffic routing of load hauling equipment, such as trolleys, mining equipment, such as excavators, support vehicles, such as mobile refueling vehicles, etc., external service sizing, and so on, and can thus be much more complex than just defining location of routes 192 and mine face 194. Nevertheless, these two mine site features are examples of those that evolve with time, indicated in the figure by mine site evolution f(t) and are sufficient for the current discussion.

MSEP 150 may specify a distribution 160 of ZGHG technologies, for example electrical technology 162 and $H_2$ technology 164. Electrical technology 162 may include rechargeable batteries, e.g., lithium-ion batteries, and $H_2$ technology 164 may include hydrogen fuel cells. Each of these technologies may include site-local regeneration sources, e.g., windmills, solar cell arrays, hydrogen gas generators, etc., whose number, type, placement, etc., may change over time. The dependency on an external service, e.g., electrical service for recharging purposes, may also change with time. The time dependency of fuel sources is indicated at p(t).

MSEP 150 may additionally specify a distribution 170 of ZGHG infrastructure that supports ZGHG mining operations. Such distribution may include, among other things, different recharging techniques, including the number, type, size, mobility, etc., of electric charging stations 172 and $H_2$ charging stations 174 as well as dynamic energy transfer equipment for switching between internal and external power sources with minimal impact on occurring mining operations by the work machine, e.g., a mining trolley, implementing such. Distribution 170 may be time-dependent as indicated at recharging capacity r(t).

MSEP 150 may further specify a distribution 180 of work machines, representatively illustrated at work machine 182, that perform mining operations and may change over time as indicated at machine usage u(t). Each of work machines 182 in distribution 180 may be equipped with a local power source 184 that provide sufficient electrical current for ZGHG mining operations. Local power sources 184 may be drawn down and recharged, repeatedly, and suffer degradation in, among other things, their capacity for recharging, holding a charge and providing sufficient current, representatively illustrated at local power source health g(t).

Exemplary MSEP 150 may specify time-varying distributions of technologies, machinery, support equipment, etc., in terms of long-term (on the order of years to decades) evolution of the mine site resulting from mining and in terms of electrification of the mine site, which may occur over a shorter period than the long-term evolution of the mine site, but may still be a long-term process nonetheless.

MSEP system 100 may be constructed to simulate MSEP 150 subject to information contained in configuration data 125. To that end, processing system 120 may be constructed or otherwise configured with a discrete event simulation (DES) processor 122 by which mine site electrification techniques are modeled as occurring in parallel with mining operations using the configuration of configuration data 125. In certain embodiments, MSEP 150 may be optimized with regard to specifications 10, which may require a business optimal MSEP, e.g., one that maximizes profit or minimizes cost. Accordingly, configuration data 125 may be continually modified and presented to processing system 120 until an optimization processor 124 identifies configuration data 125 that is associated with an MSEP 150 that is optimal in the sense of specifications 10, e.g., total cost of ownership (TCO) and/or net present value (NPV) of the implemented MSEP.

Figure 2:
FIG. 2 is a hierarchical view of components of an exemplary mine site electrification planning system by which the present inventive concept may be embodied.

FIG. 2 is a hierarchical view of components of an exemplary MSEP system 200 by which the present inventive concept may be embodied. Skilled computer programmers may recognize aspects of FIG. 2 that suggest an object-/container-oriented software paradigm and, indeed, the present invention may be so implemented. However, the description of FIG. 2 is intended to demonstrate general functionality of embodiments of the present invention through an exemplary set of features.

Exemplary MSEP 200 may comprise a set of subsystems: a model authoring subsystem 210 by which system models may be constructed, a simulation solving subsystem 240 by which simulations run using electrification configuration data are work-optimized, a 3D animation and reporting subsystem 260 by which MSEP simulations may be animated and analyzed for various performance and business metrics, and a business optimization subsystem 280 by which configuration data are reconfigured and corresponding simulations run until an MSEP is optimized in the sense of the performance and/or business metrics.

Model authoring subsystem 210 may comprise a set of components: a site model component 215 by which modeled features of the mine, e.g., site map 150, may be constructed, machine objects component 220 by which machinery data for mining operations may be constructed and an infrastructure objects component 230 by which support infrastructure features may be constructed.

Site model component 215 may include physical site information 217, e.g., site terrain information which may be imported from geographical data, route definitions, rolling resistance of site machinery, locations of load and dump zones, locations of charge/fuel stations, locations of battery swap stations, etc. Site model component 215 may further include operations defined for the mine site, e.g., shift changes, operator breaks, machinery maintenance, machinery breakdowns, machine/task assignments, trolley strategy, etc.

Machine objects component 220 may include work machine objects 222 descriptive of loaders, haulers and auxiliary machinery, etc. Machine objects component 220 may further include a machine productivity object 224 descriptive of machine performance at different granularities, including simulated sensor data are acquired from site machinery. Additionally, machine objects component 220 may include power technologies information 226 descriptive of the manner in which the machinery derives source power, e.g., diesel mechanical, diesel electric, battery electric, fuel cell electric, tethered, etc. Power technologies information 226 may also include dynamic power transfer information descriptive of the manner in which a power source is switched from internal, such as by electrical storage cells, $H_2$ Fuel cells, to external, such as by overhead power cables engaged with an onboard pantograph, and vice-versa.

Infrastructure objects component 230 may include site infrastructure information 232 descriptive of the manner in which supporting infrastructure are utilized, e.g., stationary and mobile chargers, single-lane and extra-lane trolleys, $H_2$ fuel stations, mobile $H_2$ fuel trucks, diesel fuel stations, external energy sources, on-site energy sources, such as a microgrid, etc.

Simulation solving subsystem 240 may comprise a DES component 245 to perform discrete event simulations.

DES component 245 may comprise event/behaviors information 246 descriptive of the events and behavioral event handlers implemented in a simulation. Events and event handlers may be defined for, among other things, haul performance, load/dump cycle times, queueing, bunching, load and carry operations, auxiliary operations, etc. DES component 245 may further comprise logic (events/event handlers) for mining operations 247, e.g., shift changes, operator breaks, machinery maintenance, machinery breakdowns, machine/task assignments, trolley strategy, battery management, battery life estimation, etc. Additionally, logic 247 may comprise stochastic distributions 248 from which model random variables are drawn, such as for Monte Carlo estimation techniques.

3D animation and reporting subsystem 260 may comprise components by which MSEPs are analyzed and analysis results reported: a 3D animation component 265, a performance analysis component 270 and economics analysis component 275.

3D animation component 265 may implement 3D visualization of site operations over time 267 including at load/dump zones, bottlenecks/bunching, queueing, intersections, etc. Performance component 270 may comprise mining performance metrics, e.g., truck productivity/energy charger usage, trolley usage, site-level energy usage, etc. Economics analysis component 275 may comprise economics information, e.g., business performance metrics that may be optimized through business optimization subsystem 280. Such economics information may include cost/ton, TCO, NPV, etc.

FIG. 2 presents but one example of a set of functional components by which the present inventive concept can be embodied. It is to be understood that an MSEP system implementation typically involves hundreds or thousands of objects, methods, variables that, while not explicitly described herein, should be inferred as included in MSEP 200. The functional components illustrated in FIG. 2 represent a subset of the full breadth of implementation details of an MSEP system according to the present invention but, with other features being extrapolated, the functional layout of MSEP 200 is sufficient for the skilled artisan to gain a thorough understanding of the present invention.

Figure 3:
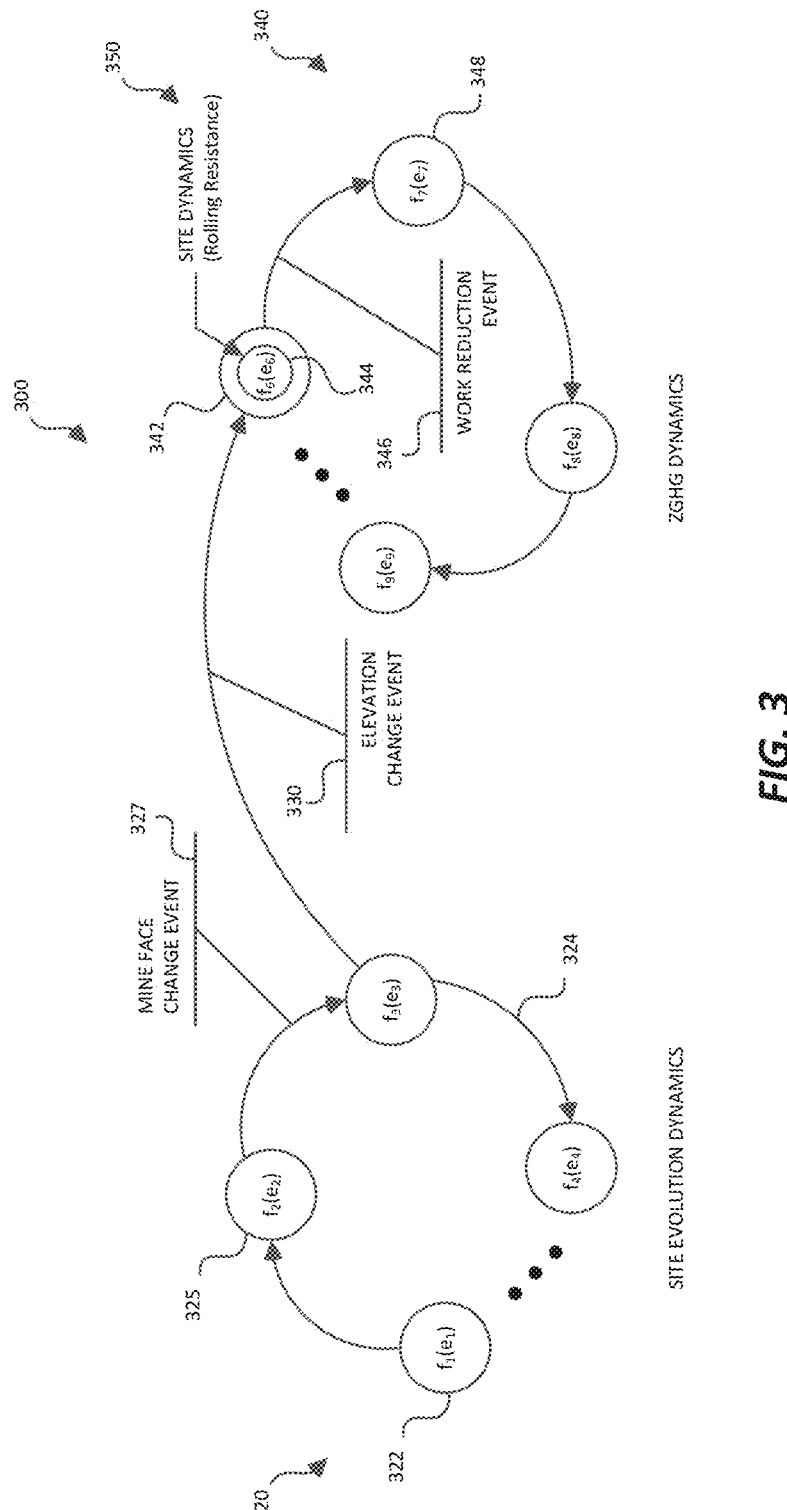
FIG. 3 is an illustration of a partial view of exemplary simulation state machine that may be used in conjunction with the present inventive concept.

FIG. 3 is an illustration of a partial view of an exemplary simulation state machine 300 that may be used in conjunction with the present invention. Exemplary simulation state machine 300 may operate in a computer model of mining operations in a discrete event simulation and is presented to demonstrate the dependence of mine site electrification dynamics on mining dynamics. Exemplary simulation state machine 300 may comprise site evolution dynamics states/events 320, ZGHG dynamics states/events 340 and physical site dynamics states/events (not illustrated in FIG. 3). Arrival at each state of simulation state machine 300, representatively illustrated at simulation state 322, is achieved solely through an event, representatively illustrated at simulation event 324. Each simulation state 322 may be associated with a corresponding event handler, representatively illustrated at state event handler 344 and marked $f_1(e_1)$-$f_9(e_9)$ in the figure, that executes simulated behavior assigned to the event. Event handlers may be encoded into a simulation model to simulate desired response behavior.

For purposes of demonstration, it is to be assumed that simulation state machine 300 resides in simulation state 325 when, at some event time t, a mine face change event 327 is invoked that simulates detection of a new location of the active mine face. In response to mine face change event 327, simulation state machine 300 may transition to simulation state 328. Simulation state 328 may be associated by way of the model design with an event handler $f_3(e_3)$, where event $e_3$ represents mine face change event 327. Event handler $f_3(e_3)$ may, among other things, analyze the mine face to identify, among other things, changes thereto that impact performance of electrical mining machines and/or mining activity that may require redeployment of ZGHG infrastructure assets in an MSEP. In the illustrated example, event handler $f_3(e_3)$ may invoke an elevation change event 330. Even from a basic understanding of physics, it can be appreciated that a change in elevation adds to the work a mining machine must perform. Additional work requires additional energy derived from an onboard battery or fuel cell. Recharging requirements in day to day mining operations and the impact of cyclic recharging over time on the health of batteries/fuel cells may be modeled and incorporated into a discrete event simulation. For example, simulation state machine 300 may be compelled into simulation state 342 in response to elevation change event 330, at which event handler $f_6(e_6)$ may be executed, where event $e_6$ represents elevation change event 330. Event handler $f_6(e_6)$ may have access to physical site dynamics information, which may include rolling resistance data 350. Accordingly, event handler $f_6(e_6)$ may compute a net difference in work owing to the elevation change and may invoke a work reduction event 346 in response to which simulation state machine 300 may transition into simulation state 348 and continue operating from that state.

Figure 4:
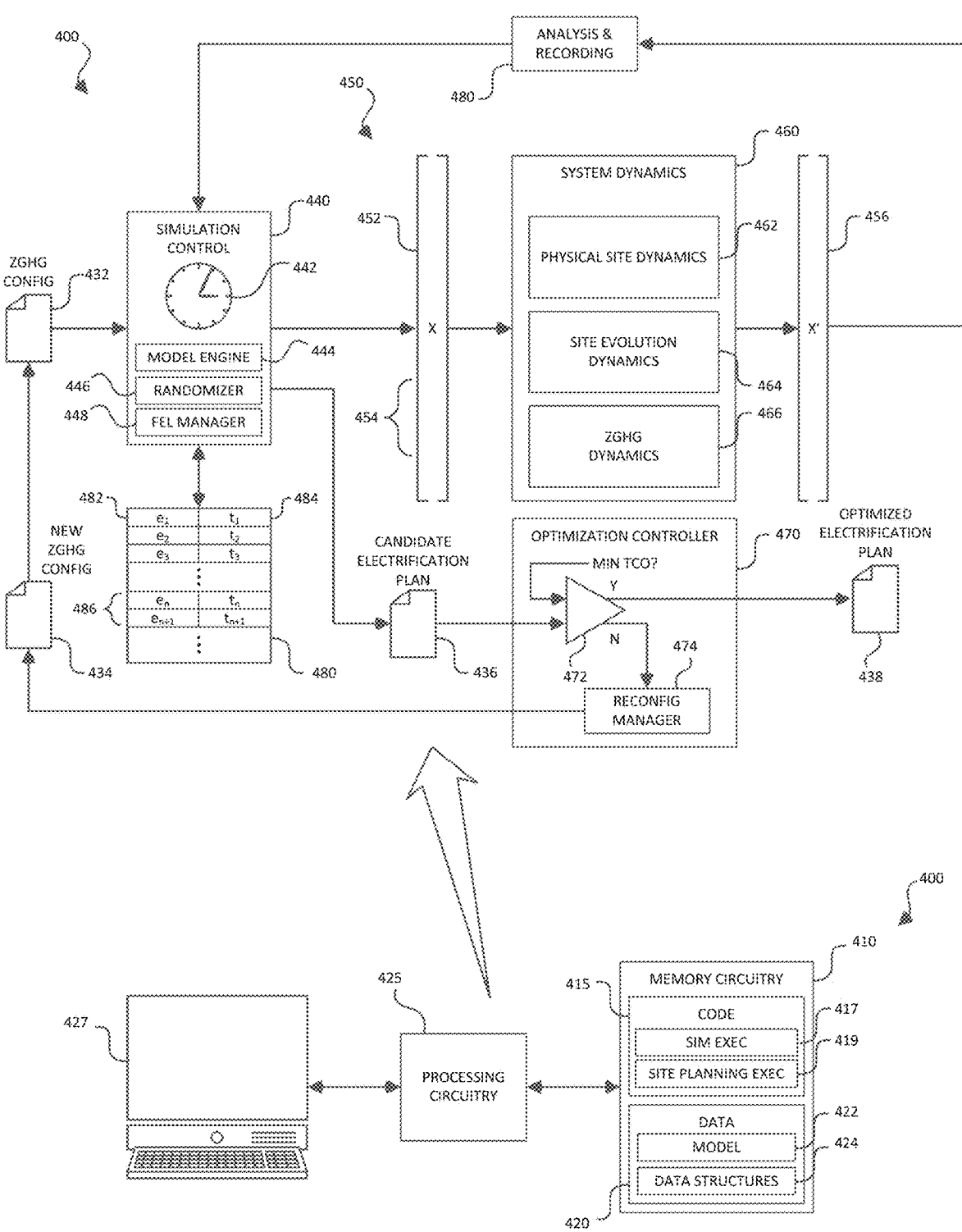
FIG. 4 is a schematic block diagram of an exemplary MSEP system by which the present inventive concept may be embodied and is explained through a circuit abstraction and an operational abstraction.

FIG. 4 is a schematic block diagram of an exemplary MSEP system 400 by which the present invention may be embodied and is explained through a circuit abstraction (lower in the figure) and an operational abstraction (upper in the figure). As illustrated in the figure, MSEP system 400 may be implemented by processor circuitry 425 that may be communicatively coupled to input/output circuitry 427 and to memory circuitry 410. Memory circuitry 410 may be constructed or otherwise configured with a code segment 415 in which computer-executable instructions may be stored and a data segment 420 in which computer-readable data may be stored. For example, code segment 415 may include instruction code for a simulation executive 417 by which processor circuitry 425 may perform MSEP simulations as well as instruction code for a site planning executive 419 by which processor circuitry 425 may implement a user interface, editing and reporting functionality, business optimization, etc. Data segment 420 of memory circuitry 410 may further be constructed or otherwise configured to store model data 422 from which processor circuitry 425 may construct a site electrification model, such as site electrification model 450 depicted in the upper portion of FIG. 4. Additionally, data segment 420 of memory circuitry 410 may further be constructed or otherwise configured to store various data structures 424 that contain information used by simulation executive 417 and site planning executive 419, some of which are described below. Whereas the embodiment of FIG. 4 closely resembles a single-user station, the present inventive concept can be readily embodied in a cloud-based system by those having skill in telecommunications and/or information technology.

LEFT OFF HEREAs discussed above, MSEP system 400 may implement DES to simulate mine operations under an MSEP. To that end, MSEP system 400 may comprise a simulation controller 440 and a site electrification model 450. To conduct a simulation through DES, simulation controller 440 may include a future event list (FEL) manager 448 by which an FEL 480 is managed and a simulation clock 442 that serves as the simulation time reference. Exemplary FEL 480 is a data structure containing a temporally ordered list of simulation events, representatively illustrated at simulation event 482. Each simulation event 482 in FEL 480 may be associated with a simulation event time, representatively illustrated at simulation event time 484 and may be invoked when simulation clock 442 arrives at the associated simulation event time 482. FEL manager 448 may, among other things, invoke events, add follow-up events to FEL 480 and maintain the temporal order of FEL 480.

MSEP system 400 may implement a site electrification model 450 that simulates mining operations under the provisos established by ZGHG configuration data 432. Accordingly, simulation controller 440 may include a model engine 444 by which site electrification model 450 is driven. Site electrification model 450 exemplified in FIG. 4 includes a system dynamics transformer 460 by which an input vector 452 of system variables is transformed into an output vector 456 of those system variables. The transformation may be conducted according to the dynamics of mine site operations that include, among others, physical site dynamics 462 that model the physics of mining including, e.g., gravity, rolling resistance of vehicles, etc., site evolution dynamics 464 that model the changing site characteristics that are products of mining, e.g., pit expansion, mine face changes, route changes, etc., and ZGHG dynamics 466 that model the impact on mining due implementing an MSEP, e.g., recharging requirements, battery SoC/SoH, battery swaps, etc.

A simulation conducted through MSEP 400 may be based on ZGHG configuration data 432 provided to simulation controller 440. ZGHG configuration data 432 may define distributions of ZGHG assets with which the simulation is conducted, such as and without being limited to, the number, power and locations of battery/fuel cell chargers; the number, power and location of trolley segments; usage of trolley power (propulsion vs. charging); model(s), configuration(s) and number of hauling machines; model(s), configuration(s) and number of loaders, task/machine assignment strategy (open vs. locked); charging frequency; battery replacement SoH; charger locations; movement timing.

Upon acceptance of ZGHG configuration data 432, MSEP system 400 may be initialized for a simulation. For example, FEL manager 448 may populate FEL 480 with simulation events 482 that are to be simulated, including ZGHG-related events 486. As used herein, "ZGHG-related" events, variables and the like are those mining events that occur due to mine site electrification, such as those exemplified in FIG. 3. Initialization may also include exemplary model engine 444 assigning initial values to random variables in input vector 452 that are drawn from stochastic distributions by a randomizer 446 in a manner consistent with Monte Carlo simulation techniques. The random variables in both input vector 452 and output vector 456 may include ZGHG-related variables, representatively illustrated at ZGHG-related variables 454.

Once initialized, simulation controller 440 may advance simulation clock 442 to the first event time 484 $t_1$ in FEL 480 and may invoke the corresponding event 482 $e_1$. Model engine 444 may assign values to random variables in input vector 452 and may apply system dynamics transformer 460 thereto to generate an output vector 456 of the random variables. Output vector 456 may be indicative of the state of modeled mining operations responsive to invocation of the event. At each simulation event time 484 and responsive to the invocation of the associated event 482, model engine 444 may execute site electrification model 450 to generate a new output vector 456. Output vector 456 may be analyzed at analysis and recording processor 490 as to the state of modeled mining operations resulting from the most recently invoked event and may record results of the analysis in a candidate MSEP 436. Candidate MSEP 436 may be a time-indexed data structure of events and responses to events of an MSEP, as well as associated performance and business metrics for the current ZGHG configuration data 432.

Candidate MSEP 436 may be conveyed to an optimization controller 470 whereby it may be analyzed for various of the performance and/or business metrics. Optimization controller 470 may include a business optimizing component 472 by which it may be determined whether candidate MSEP 436 is that associated with optimal business metrics, e.g., TCO and/or NPV. If such is the case, optimization controller 470 may provide an optimized MSEP 438 to external processes, such as the visualization and reporting discussed above with respect to FIG. 2. In this regard, the tool can allow visualization and investigation of each of the results analyzed, rather than just an optimized one, for instance. Thus, one or more embodiments of the disclosed subject matter can provide data to all results to allow, for instance, the user or operator, to investigate and select the solution identified (e.g., by the user or operator) to be optimized and robust. However, if business optimizing component 472 determines that the configuration of assets defined in ZGHG configuration data 432 does not achieve business goals, e.g., min[TCO], in implementing candidate MSEP 436, an indication of such may be provided to a reconfiguration manager 474 that, in response, generates a new distribution of assets in new ZGHG configuration data 434. New ZGHG configuration data 434 may be provided to simulation controller 440 and the foregoing operations may be repeated.

In an investigation, a MSEP simulation may include parameters/constraints beyond the list of events defined in the FEL. Mine planning may be subject to, for example, constraints of productivity, e.g., material moved in a certain amount of time (shift, day, week). Accordingly, embodiments may execute time-based MSEP simulation, the outcome being sought may be a production level and a cost. An optimization process in optimization processor 470, for example, may first identify equipment combinations that meet or exceed the material movement plan, and then find the equipment combination(s) that achieve or exceed the plan at the lowest NPC.

It is to be understood that an MSEP may be implemented over a number of phases and the operations described above may be repeated for each phase of the MSEP. Furthermore, according to one or more embodiments of the disclosed subject matter, the optimized solution can be identified for each phase as well as when the miner should transition from one configuration to another. This can include the costs of new assets (e.g., trucks, chargers, trolley, etc.) as well as the cost to relocate them to find the best NPV solution for the mine over time.

Figure 5:
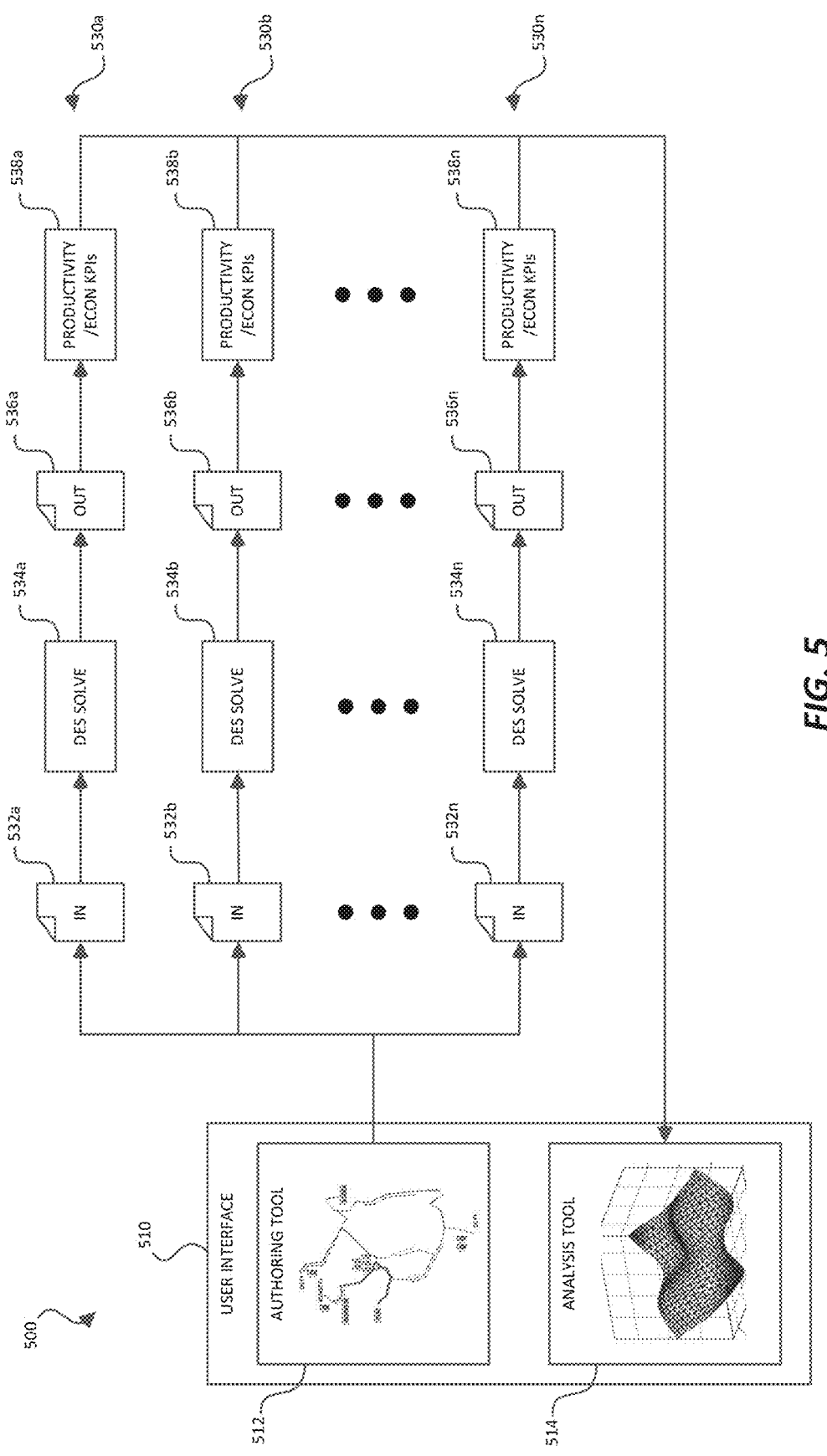
FIG. 5 is a schematic flow diagram of an exploratory mode that may be implemented through embodiments of the present inventive concept.

FIG. 5 is a schematic flow diagram of an exploratory mode 500 that may be implemented in embodiments of the present inventive concept. In certain instances, a mining engineer, mine operator or other entity may want to interactively investigate different configurations, i.e., different distributions of electrical mining machines and supporting equipment that cooperate in a corresponding MSEP. In many of such instances, exploratory mode 500 may bypass the economics optimization described above in favor of affording general investigations into MSEP under arbitrary or user-selected configuration constraints seeking arbitrary or user-selected operational targets or goals. Moreover, exploratory mode 500 may allow a user to demark different MSEP phases, to establish what mining operations and mine site electrification operations occur in each MSEP phase and to modify the phase boundaries, the mining and electrification operations, and any other of the many mining parameters and behaviors that can be simulated by embodiments of the present invention.

A user interface 510 may be provided into exploratory mode 500 and constructed from circuitry described above with reference to FIG. 4. User interface 510 may implement, among other things, an authoring tool 512 by which an investigator can establish different mine site configurations and an analysis tool 514 by which resulting MSEPs and related data may be provided to the investigator for study. User interface 510 may be provided as a service of site planning executive 419.

A session in exploratory mode 500 may begin with the investigator establishing mine site configurations that identify distributions of electrical mining machines and supporting equipment of an MSEP, ambient environmental parameters, power technologies (carbon fuel, $H_2$ fuel cells, electrical storage cells), etc. that define conditions of mine site electrification planning for a particular study. Such conditions of study may be established through suitable data entry controls (not separately illustrated) of authoring tool 512. It is to be understood that the present invention is not limited to specific techniques by which information is entered into user interface 510 (including by way of graphical interface controls requiring no textual data entry) or by which information is presented on user interface 510 (including 3D analytical surfaces/manifolds over user defined axes). Technicians familiar with data science/information presentation will identify and appreciate numerous techniques by which information can be entered and/or displayed in various embodiments of the invention without departing from the spirit and intended scope thereof.

An investigator at authoring tool 512 may construct different data sets, e.g., input files 532a-532n, representatively referred to herein as input file(s) 532, that are processed in separate, parallel threads 530a-530n, representatively referred to herein as MSEP thread(s) 530. Moreover, optimization mechanisms previously described may be disengaged or otherwise overridden in favor of human curiosity and interactive control over respective simulator runs. Each MSEP thread 530 may encompass an aspect of MSEP that can be distinguished or otherwise separated from other aspects thereof, essentially without limitation as to what parameters are explored in each MSEP thread 530. For each input file 532 containing MSEP parameters for a corresponding slice of the analysis, a corresponding one of DES solving processors 534a-534n, representatively referred to herein as DES solving processor(s) 534, may execute a simulation for that MSEP thread 530 as described above with reference to FIG. 4 excluding optimization controller 470. DES solving processors 534 may generate respective output files 536a-536n, representatively referred to herein as output file(s) 536, from which respective productivity and economic (P/E) performance indexes 528a-538n, representatively referred to herein as P/E index(es) 528, are derived in a manner similar to that described above with reference to FIG. 4.

MSEP threads 530, or more accurately output data generated in each MSEP thread 530, may be provided to analysis tool 514 which may have access to a variety of computer-executed data analysis techniques, e.g., 3D animation and reporting subsystem 260, for visualizing, merging, performing mathematical operations and transforms on multivariate data, any of which may be used when practicing the present invention. Authoring tool 512 and analysis tool 514 may interoperate to allow exploration of what-if scenarios, where an investigator configures the what-if scenario on authoring tool 512 and is provided the results thereof on analysis tool 514.

As one example, it is to be assumed that an investigator would like to study a phased MSEP, i.e., an MSEP that occurs in phases. That investigator might configure a number of MSEP phases, e.g., producing an input file 532 defining an MSEP configuration on which an MSEP simulated in each MSEP thread 530. Executing the simulations in DES solving processors 534 thus simulates a different phase of an MSEP, with each phase having different configurations of work machines and supporting equipment, different phase start and end conditions, etc. The investigator may perform the what-if analysis described above to vary the different configurations of work machines and supporting equipment, different phase start and end conditions, and so on.

Figure 6:
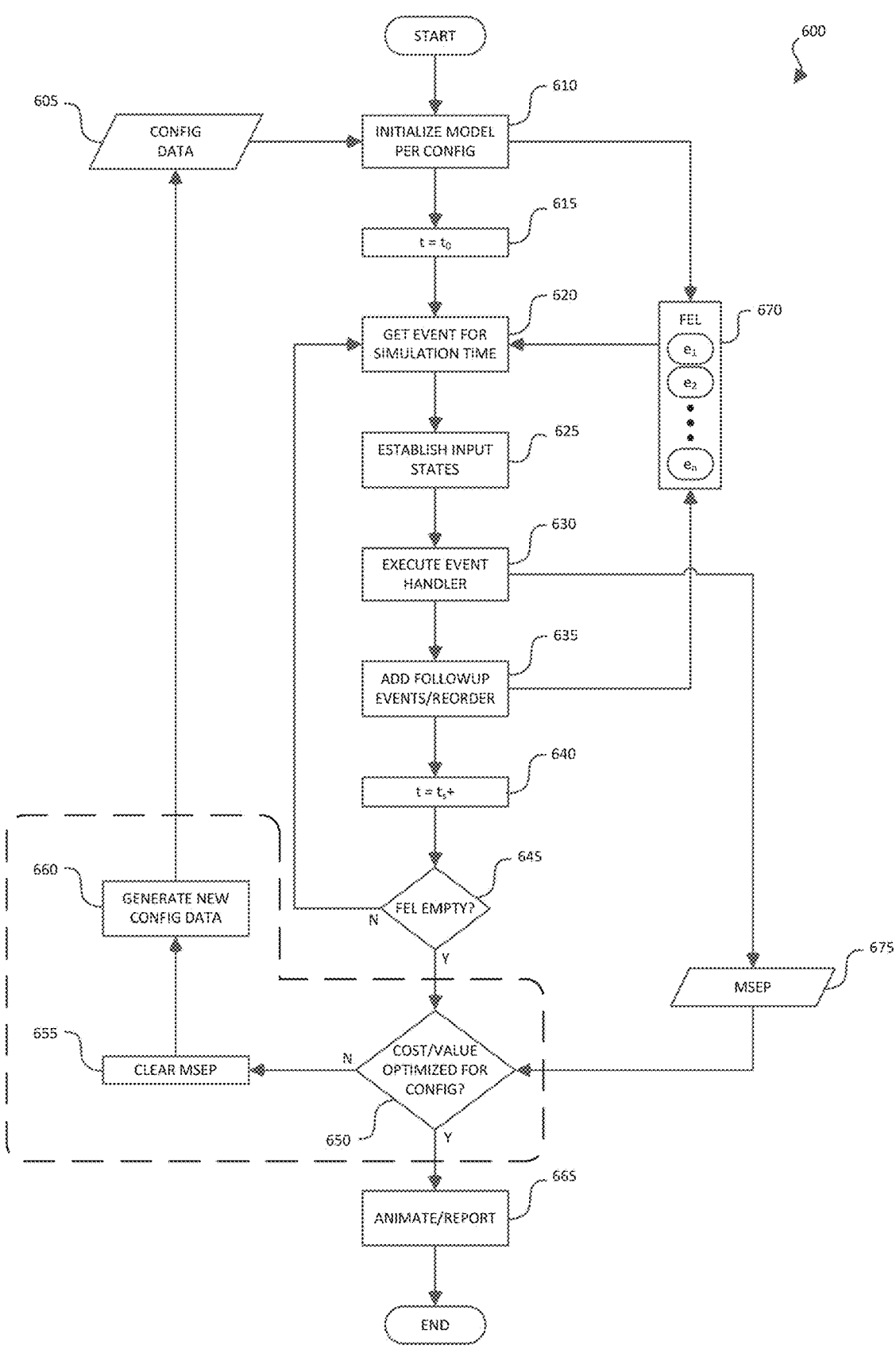
FIG. 6 is a flow diagram of an exemplary MSEP process by which the present inventive concept can be embodied.

FIG. 6 is a flow diagram of an exemplary MSEP process 600 by which the present inventive concept can be embodied. In operation 610, a simulation model may be initialized based on configuration data 605 and, in operation 615, a simulation time may be initialized to some initial time to. In operation 620, the event associated with the simulation time may be retrieved from FEL 670 and corresponding input states may be established in operation 625. In operation 630, the event handler for the retrieved event may be executed and the simulation time, event and modeled response behavior may be stored in MSEP 675. The modeled response behavior may include invocation of additional events and, in operation 635, the additional events may be added to FEL 680 and FEL 680 may be reordered in temporal order. In operation 640, the simulation time may be updated to the next event time in FEL 680 and, in operation 645, it may be determined whether FEL 680 is empty. Here, the simulation can be set up to execute a certain amount of material movement in a certain amount of time (per mine plan) to approximately match fleet productivity between scenarios so that we can evaluate the cost of operating the mine to plan with different configurations of assets. Furthermore, the simulation may not be regarded as just a list of events as described (the FEL). Rather, the simulation can be regarded as a mine plan that needs to be achieved, i.e., material moved in a certain amount of time (shift, day, week). So suspension of the simulation can be time based, for instance, and the outcome can be a production level and a cost. The optimizer can first identify equipment combinations that meet or exceed the material movement plan, and then find the equipment combination(s) that achieve or exceed the plan at the lowest NPC.

Still referring to FIG. 6, if not, MSEP 600 may transition to operation 620 and continue from that point as described above. If, however, it is determined at operation 645 that FEL 680 is not empty, MSEP process 600 may transition to operation 650 at which it is determined whether MSEP is business optimized, e.g., minimum TCO/maximum NPV. If not, MSEP 685 may be cleared in operation 655 and, in operation 660, new configuration data 605 may be generated. MSEP process 600 may then transition to operation 610 and continue from that point. If, however, it is determined in operation 650 that MSEP 685 is business optimal, MSEP process 600 may transition to operation 665 where MSEP 685 may be animated and otherwise reported.

MSEP process 600 may be executed in exploratory mode 500 by eliminating the automatic optimization operations within the dashed-line box.

INDUSTRIAL APPLICABILITY

Mine operators seek to minimize the business impact of mine site infrastructure costs while concurrently minimizing the environmental impact of mining operations. Electrification of a mine site, i.e., adapting the mine site machinery and supporting equipment for mine site operations that rely on local electric power sources, is a significant cost against the mine operator's bottom line. Thus, to minimize the economic impact of such electrification, prudent planning is essential. Rechargeable batteries, hydrogen fuel cells and the like have a shorter usable lifetime than a fossil fuel tank and may require replacement prior to closing mining operations at the site. Moreover, such rechargeable power sources suffer diminished recharge capacity, e.g., holding charge, producing current, etc., by cyclic discharge/recharge of the power sources over time.

The inventive concept described in this disclosure simulates mining operations under a configuration of ZGHG assets and reconfigures the ZGHG assets until the corresponding simulated mining operations are optimal with respect to business concerns, such as total cost of ownership of the ZGHG assets. The simulated mining operations take into consideration features that are peculiar to electrification of a mine site, such as the aforementioned diminished recharge capacity of rechargeable power sources.

Embodiments of the disclosed subject matter can also be as set forth according to the following parentheticals.

(1) A method for implementing different zero-emission (electrification)-related equipment configurations at a mine site as extraction at the mine site evolves over time, the method comprising: receiving, as an electronic input at processing circuitry, a long-term mine plan; automatically determining, using the processing circuitry, a plurality of different zero-emission-related equipment configurations for respective different phases of the long-term mine plan and timing to switch from one of the determined zero-emission-related equipment configurations to another of the determined zero-emission-related equipment configurations, where each of the determined zero-emission-related equipment configurations per phase of the long-term mine plan provides an optimal zero-emission-related equipment configuration for the phase from among a plurality of different zero-emission-related equipment configurations that achieve that phase of the long-term mine plan; and outputting, using the processing circuitry, as part of a zero-emission-related equipment configuration plan that supplements the long-term mine plan, the determined optimal zero-emission-related equipment configurations for each of the phases of the long-term mine plan, wherein said automatically determining, for each of the determined optimal zero-emission-related equipment configurations, is performed based on analysis of parameter variation combinations as inputs.

(2) A system to identify different electrification-related equipment configurations at a minesite, the system comprising: a simulation module to provide a Discrete Event Simulation (DES) of the evolution of the mine site over time, which may be regarded as a base simulation method for one or more embodiments of the disclosed subject matter, according to a predetermined long-term mine plan; an optimization module wrapped around the Discrete Event Simulation (DES) to automatically determine a plurality of different optimized electrification-related equipment configurations to achieve respective different temporal portions of the predetermined long-term mine plan at a lowest predetermined value, each of the different optimized electrification-related equipment configurations being determined based on model authoring using varying different combinations of available options for the minesite as inputs; and an output module to output an electrification-related equipment configuration plan comprised of the plurality of different optimized electrification-related equipment configurations.

(3) A mine site electrification planning system comprising: memory circuitry constructed to store model data, simulation instruction code and site planning instruction code; and processor circuitry constructed to: accept configuration data that define distributions of electrical mining machines and supporting equipment that cooperate in a corresponding mine site electrification plan; execute the simulation instruction code to thereby retrieve the model data and to simulate therewith temporal evolution of the mine site electrification plan under conditions established by the configuration data; and execute the site planning instruction code to thereby iteratively provide to the executing simulation instruction code modified configuration data until an optimal mine site electrification plan meets an optimization criterion indicative of a cost factor of mine operations that physically implement the corresponding mine site electrification plan; and a user interface communicatively coupled to the processor circuitry and constructed to display the configuration data with which the optimal mine site electrification plan was simulated.

(4) The mine site electrification planning system of (3), wherein the processor circuitry is further constructed to: configure a discrete event simulation (DES) with the model data and the configuration data; and execute the DES to simulate therewith the temporal evolution of the mine site electrification plan.

(5) The mine site electrification planning system of (3) or (4), wherein the configuration data includes distributions of electrical cell types supplying electrical current to the respective electrical mining machines.

(6) The mine site electrification planning system of any one of (3) to (5), wherein the distribution of the electrical cell types include rechargeable batteries and hydrogen fuel cells.

(7) The mine site electrification planning system of any one of (3) to (6), wherein the processor circuitry is further constructed to execute the DES to simulate diminishing recharge capacity of the electrical cells as part of the simulation of the temporal evolution of the mine site electrification plan.

(8) The mine site electrification planning system of any one of (3) to (7), wherein the processor circuitry is further constructed to: iteratively modify the distribution of ZGHG assets in the configuration data for each of a set of phases over which the mine site electrification plan is implemented; and execute the site planning instruction code to thereby iteratively provide the modified configuration data to the executing simulation instruction until the optimal mine site electrification plan meets the optimization criterion for each of the phases.

(9) The mine site electrification planning system of any one of (3) to (8), wherein the optimization condition is minimum total cost of ownership or maximum net present value for the distribution of electrical mining machines and supporting equipment.

(10) A processor-executable mine site electrification planning process comprising: accepting a configuration data structure defining a distribution of zero greenhouse gas producing (ZGHG) mining assets; simulating mining operations using the distribution of ZGHG mining assets defined in the configuration data structure; analyzing the simulated mining operations for economic factors in implementing a mine site electrification plan in accordance therewith; iteratively modifying the distribution of ZGHG assets in the configuration data structure and simulating the mining operations therewith seeking the distribution of ZGHG mining assets for which the analyzing thereof indicates the economic factors meet an optimization condition; and providing the mine site electrification plan that uses the distribution of ZGHG mining assets for which the analyzing thereof indicates the economic factors meet the optimization condition.

(11) The mine site electrification planning process of (10), wherein simulating the mining operations includes: constructing a processor-executable model by which the mining operations are simulated as a series of temporally ordered events; and executing event handlers constructed in the model in the temporal order of the events.

(12) The mine site electrification planning process of (10) or (11), wherein constructing the model includes constructing a set of the event handlers to simulate the mining operations that differ from the mining operations that produce carbon emissions due to implementing the mine site electrification plan.

(13) The mine site electrification planning process of any one of (10) to (12), wherein constructing the set of event handlers includes constructing event handlers that simulate charge usage of onboard power sources of the ZGHG mining assets due to the mining operations.

(14) The mine site electrification planning process of any one of (10) to (13), wherein constructing the set of event handlers includes constructing event handlers that simulate recharging the onboard power sources.

(15) The mine site electrification planning process of any one of (10) to (14), further comprising: establishing phases over which the mine site electrification plan is to be performed; defining the distribution of ZGHG mining assets for each of the phases; and iteratively modifying the distribution of ZGHG assets for each of the phases and simulating the mining operations therewith seeking the distribution of ZGHG mining assets for which the analyzing thereof indicates the economic factors meet an optimization condition for each of the phases.

(16) The mine site electrification planning process of any one of (10) to (15), further comprising establishing the optimization condition as minimum total cost of ownership or maximum net present value for the distribution of the ZGHG mining assets.

(17) The mine site electrification planning process of any one of (10) to (16), wherein the distribution of the ZGHG mining assets include electric loaders, electric haulers and electric chargers therefor.

(18) The mine site electrification planning process of any one of (10) to (17), wherein simulating the mining operations includes simulating the mining operations using discrete event simulation.

(19) A mine site electrification planning apparatus comprising: a model component constructed to simulate mine site operations under a mine site electrification plan; a simulation control component constructed to provide to the model component configuration data descriptive of varying distributions of zero greenhouse gas emitting (ZGHG) mining assets for which the mine site electrification plan is simulated; and an optimization control component constructed to identify the configuration data associated with the simulated mine site electrification plan that meets an economic optimization criterion related to physically implementing the mine site electrification plan.

(20) The mine site electrification planning apparatus of (19), wherein the simulation control component is further constructed to operate the model component as a discrete event simulation of a temporal evolution of the mine site electrification plan.

(21) The mine site electrification planning apparatus of (19) or (20), wherein the discrete event simulation simulates diminishing recharge capacity of electrical cells in the varying distributions of ZGHG mining assets during the temporal evolution of the mine site electrification plan.

(22) The mine site electrification planning apparatus of any one of (19) to (21), wherein the optimization control component is further constructed to: iteratively provide individual ones of the varying distributions of ZGHG mining assets to the simulation control component at which the corresponding the mine site electrification plan is simulated; and analyze the simulated mine site electrification plan against the economic optimization criterion as the ZGHG mining assets in the configuration data are varied to identify the configuration data associated with the simulated mine site electrification plan that meets the economic optimization criterion.

Certain embodiments of the present general inventive concept provide for the functional components to manufactured, transported, marketed and/or sold as processor instructions encoded on computer-readable media. The present general inventive concept, when so embodied, can be practiced regardless of the processing platform on which the processor instructions are executed and regardless of the manner by which the processor instructions are encoded on the computer-readable medium.

It is to be understood that the computer-readable medium described above may be any non-transitory medium on which the instructions may be encoded and then subsequently retrieved, decoded and executed by a processor, including electrical, magnetic and optical storage devices. Examples of non-transitory computer-readable recording media include, but not limited to, read-only memory (ROM), random-access memory (RAM), and other electrical storage; CD-ROM, DVD, and other optical storage; and magnetic tape, floppy disks, hard disks and other magnetic storage. The processor instructions may be derived from algorithmic constructions in various programming languages that realize the present general inventive concept as exemplified by the embodiments described above.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents. As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Further, as used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present. This definition of "circuitry" can apply to all uses of this term in this application, including in any claims. As a further example, as used in this application, the term "circuitry" can also cover an implementation of merely a processor (or multiple processors) or portion of a processor and its (or their) accompanying software and/or firmware.

Use of the terms "data," "content," "information" and similar terms may be used interchangeably, according to some example embodiments of the present disclosure, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Aspects of the present disclosure have been described above with reference to flowchart illustrations and/or block diagrams of methods, apparatus (systems) and computer program products according to embodiments of the present disclosure. In this regard, the flowchart and block diagrams in the Figures illustrate the architecture, functionality, and operation of possible implementations of systems, methods and computer program products according to various embodiments of the present disclosure. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A method, comprising:

receiving, at a simulation controller, a future event list that includes a plurality of mining events, related to electrification of a mine site, that are to be simulated;

receiving, at the simulation controller, configuration data that includes a plurality of configurations of work machines and supporting equipment locatable at the mine site;

determining, by the simulation controller and based on the future event list and the configuration data, for a plurality of phases during the electrification of the mine site, respective configurations of work machines and supporting equipment, of the plurality of configurations of work machines and supporting equipment, that meet one or more performance metrics for the mine site; and controlling, during a mining operation, dynamic energy transfer equipment to switch between internal power sources and external power sources for one or more work machines in respective phases, of the plurality of phases, according to the respective configurations of work machines and supporting equipment.

2. The method of claim 1, wherein determining the respective configurations of work machines and supporting equipment that meet the one or more performance metrics for the mine site comprises:

simulating respective mining events, of the plurality of mining events, using the plurality of configurations of work machines and supporting equipment locatable at the mine site to determine the respective configurations of work machines and supporting equipment for the plurality of phases.

3. The method of claim 1, wherein the plurality of phases include a series of transitional deployment phases in which greenhouse gas producing technologies are gradually replaced with net-zero greenhouse gas producing technologies.

4. The method of claim 1, further comprising determining the plurality of phases including establishing what mining operations occur in each phase, of the plurality of phases, and determining phase boundaries for the plurality of phases.

5. The method of claim 1, further comprising physically relocating the one or more work machines or supporting equipment at the mine site by deploying new assets at the mine site during the mining operation.

6. The method of claim 1, further comprising physically relocating the one or more work machines or supporting equipment at the mine site by changing locations of at least one of charging stations or fuel stations during the mining operation.

7. The method of claim 1, further comprising physically relocating the one or more work machines or supporting equipment at the mine site by changing locations of battery swap stations during the mining operation.

8. The method of claim 1, further comprising physically relocating the one or more work machines or supporting equipment at the mine site by changing at least one of models, configurations, or number of hauling machines or loaders during the mining operation.

9. The method of claim 1, wherein the one or more performance metrics comprise at least one of a truck productivity, an energy charger usage, a trolley usage, or a site-level energy usage.

10. The method of claim 1, wherein determining the respective configurations of work machines and supporting equipment that meet the one or more performance metrics for the mine site comprises determining the respective configurations further based on:

physical site dynamics that model physics of mining; and site evolution dynamics that model changing site characteristics that are products of mining.

11. The method of claim 10, wherein the physics of mining include at least one of gravity or rolling resistance of vehicles.

12. The method of claim 10, wherein the changing site characteristics include at least one of pit expansion, mine face changes, or route changes.

13. The method of claim 1, wherein the plurality of mining events include a mine face change event and an elevation change event.

14. The method of claim 1, wherein the configuration data includes one or more of number, power, or locations of battery chargers or fuel cell chargers, number, power, or locations of trolley segments, usage of trolley power including propulsion or charging, models, configurations, or number of hauling machines, models, configurations, or number of loaders, task or machine assignment strategy including open or locked, charging frequency, battery replacement state of health, charger locations, or movement timing.

15. A method, comprising:

performing a mining operation by:

receiving, at a simulation controller, a future event list that includes a plurality of mining events, related to electrification of a mine site, that are to be simulated;

receiving, at the simulation controller, configuration data that includes a plurality of configurations of work machines and supporting equipment locatable at the mine site;

determining, by the simulation controller and based on the future event list and the configuration data, for a plurality of phases during the electrification of the mine site, respective configurations of work machines and supporting equipment, of the plurality of configurations of work machines and supporting equipment, that meet one or more performance metrics for the mine site; and during the mining operation, controlling dynamic energy transfer equipment to switch between internal power sources and external power sources for one or more work machines in respective phases, of the plurality of phases, according to the respective configurations of work machines and supporting equipment.

16. The method of claim 15, further comprising physically deploying net-zero greenhouse gas producing technologies by changing at least one of models, configurations, or number of hauling machines or loaders at the mine site during the mining operation.

17. The method of claim 15, further comprising physically deploying net-zero greenhouse gas producing technologies by deploying new assets at the mine site during the mining operation.

18. A method, comprising:

performing a mining operation by:

receiving, at a simulation controller, a future event list that includes one or more mining events, related to electrification of a mine site, that are to be simulated;

receiving, at the simulation controller, configuration data that includes a plurality of configurations of work machines and supporting equipment locatable at the mine site;

determining, by the simulation controller and based on the future event list and the configuration data, for a first phase of the mining operation during the electrification of the mine site, a first configuration of work machines and supporting equipment, of the plurality of configurations of work machines and supporting equipment, that meets one or more performance metrics for the mine site in the first phase; and controlling, during the first phase, dynamic energy transfer equipment to switch between internal power sources and external power sources for one or more work machines according to the first configuration of work machines and supporting equipment.

19. The method of claim 18, further comprising:

determining, by the simulation controller and based on the future event list and the configuration data, for a second phase of the mining operation during the electrification of the mine site after the first phase, a second configuration of work machines and supporting equipment, of the plurality of configurations of work machines and supporting equipment, that meets one or more performance metrics for the mine site in the second phase; and controlling, during the second phase, the dynamic energy transfer equipment to switch between the internal power sources and the external power sources for the one or more work machines according to the second configuration of work machines and supporting equipment.

* * * * *